(12) United States Patent
Bi et al.

(10) Patent No.: US 7,756,313 B2
(45) Date of Patent: Jul. 13, 2010

(54) SYSTEM AND METHOD FOR COMPUTER AIDED DETECTION VIA ASYMMETRIC CASCADE OF SPARSE LINEAR CLASSIFIERS

(75) Inventors: Jinbo Bi, Chester Springs, PA (US); Senthil Periaswamy, Malvern, PA (US); Kazunori Okada, Los Angeles, CA (US); Toshiro Kubota, Lewisburg, PA (US); Glenn Fung, Madison, WI (US); Marcos Salganicoff, Philadelphia, PA (US); R. Bharat Rao, Berwyn, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 922 days.

(21) Appl. No.: 11/592,869

(22) Filed: Nov. 3, 2006

(65) Prior Publication Data
US 2007/0110292 A1    May 17, 2007

Related U.S. Application Data

(60) Provisional application No. 60/736,415, filed on Nov. 14, 2005, provisional application No. 60/760,014, filed on Jan. 18, 2006.

(51) Int. Cl.
*G06K 9/00* (2006.01)
(52) U.S. Cl. .................................. 382/128
(58) Field of Classification Search ......... 382/128–132; 706/12, 15
See application file for complete search history.

(56) References Cited

U.S. PATENT DOCUMENTS
6,141,437 A * 10/2000 Xu et al. .................... 382/130
2004/0184647 A1    9/2004 Reeves et al.

OTHER PUBLICATIONS

Campadelli et al. ("Support vector machines for candidate nodules classification", Neuro-computing, Elsevier Science Publishers, Amsterdam, NL, vol. 68, May 2005, pp. 281-288).*
Liu et al. ("Total margin based adaptive Fuzzy support vector machines for multi-view face recognition", IEEE cat. No. 05CH37706, IEEE Piscataway, NJ, USA, vol. 2, Oct. 10, 2005, pp. 1704-1711).*
Benjamin (the U.S. Appl. No. 60/623,054).*
Bi et al. ("Dimensionality reduction via sparse support vector machines", Journal of Machine learning Research, MIT Press USA, vol. 3, No. 7-8, Mar. 1, 2003, pp. 1229-1243).*
Wu et al. ("Linear Asymmetric Classifier for Cascade detectors", ICML 2005- Proceeding of 22nd Int'l Conf on Machine learning, Aug. 7, 2005, pp. 988-995).*

(Continued)

*Primary Examiner*—Vu Le
*Assistant Examiner*—Amara Abdi

(57) ABSTRACT

A method for computer aided detection of anatomical abnormalities in medical images includes providing a plurality of abnormality candidates and features of said abnormality candidates, and classifying said abnormality candidates as true positives or false positives using a hierarchical cascade of linear classifiers of the form $\text{sign}(w^T x + b)$, wherein x is a feature vector, w is a weighting vector and b is a model parameter, wherein different weights are used to penalize false negatives and false positives, and wherein more complex features are used for each successive stage of said cascade of classifiers.

20 Claims, 3 Drawing Sheets

OTHER PUBLICATIONS

Campadelli et al. ("Support vector machines for candidate nodules classification", Neuro-computing, Elsevier Science Publishers, Amsterdam, NL, vol. 68, May 2005, pp. 281-288).*

Ayhan Demiriz et al., Linear Programming Boosting via Column Generation, Nov. 24, 2000, pp. 1-22.

Jinbo Bi, et al. "Column-Generation Boosting Methods for Mixture of Kernels", KDD'04, Aug. 22-25, 2004, Seattle, WA.

Jinbo Bi, et al., "Computer Aided Detection Via Asymmetric Cascade of Sparse Hyperplane Classifiers", KDD'06, Aug. 20-23, 2006, Philadelphia, PA.

Campadelli at al., "Support vector machines for candidate nodules classification", Neurocomputing, Elsevier Science Publishers, Amsterdam, NL, vol. 68, May 2005, pp. 281-288.

Wu et al., "Linear asymmetric classifier for cascade detectors", ICML Proc. Int. Conf. Mach. Learn.; ICML 2005—Proceedings of the $22^{nd}$ Int'l Conf. on Machine Learning, Aug. 7, 2005, pp. 988-995.

Bi et al, "Dimensionality reduction via sparse support vector machines", Journal of Machine Learning Research MIT Press USA, vol. 3, No. 7-8, Mar. 1, 2003, pp. 1229-1243.

Liu et al., "Total margin based adaptive fuzzy support vector machines for multiview face recognition", The International Conference on System, Man and Cybernetics (IEEE Cat. No. 05CH37706) IEEE Piscataway, NJ, USA, vol. 2, Oct. 10, 2005, pp. 1704-1711.

Morik et al., "Knowledge discovery and knowledge validation in intensive care", Artificial Intelligence in Medicine Elsevier Netherlands, vol. 19, No. 3, Jul. 2000, pp. 225-249.

* cited by examiner

|  | $C_1$ | $C_2$ | $C_3$ | SVM | LDA |
|---|---|---|---|---|---|
| Feature set 1 | 2 | 1 | 0 | 7 | 3 |
| Feature set 2 | — | 8 | 5 | 12 | 7 |
| Feature set 3 | — | — | 2 | 14 | 6 |
| # candidates | 3011 | 393 | 102 | 231 | 298 |
| Detection rate | 93.6 | 89.1 | 87.5 | 87.5 | 83.3 |
| FP / volumn | 34.1 | 3.5 | 0.7 | 2.2 | 3.0 | ns
SYSTEM AND METHOD FOR COMPUTER AIDED DETECTION VIA ASYMMETRIC CASCADE OF SPARSE LINEAR CLASSIFIERS

CROSS REFERENCE TO RELATED UNITED STATES APPLICATIONS

This application claims priority from: "Method and Apparatus for Computer Aided Detection via Asymmetric Cascade of Sparse Linear Classifiers", U.S. Provisional Application No. 60/736,415 of Bi, et al., filed Nov. 14, 2005; and "Computer Aided Detection via Asymmetric Cascade of Sparse Linear Classifiers", U.S. Provisional Application No. 60/760,014 of Bi, et al., filed Jan. 18, 2006, the contents of both of which are incorporated herein by reference in their entirety.

TECHNICAL FIELD

This invention is directed to classifiers used in computer aided detection (CAD) systems.

DISCUSSION OF THE RELATED ART

Over the last decade, Computer-Aided Detection (CAD) systems have moved from the realm of academic publications to robust commercial systems that are used by physicians in their clinical practice to help detect early cancer from medical images. The growth has been fueled by the Food and Drug Administrations (FDA) decision to grant approval in 1998 for a CAD system that detected breast cancer lesions from mammograms (scanned x-ray images). Since then a number of CAD systems have received FDA approval. Virtually all these commercial CAD systems focus on detection (or more recently diagnosis) of breast cancer lesions for mammography. The CAD concept has been generalized to many other detection tasks in medical image analysis, such as lung nodule detection, and colon polyp detection.

The typical workflow for a CAD system when used to identify structures in a new patient image is as follows.

1. Identify candidate structures in the image: Most medical images, particularly image volumes generated by high resolution computed tomography (CT), are quite large. Typically, a very efficient image processing algorithm considers each pixel (or voxel) in the image as a potential candidate seed, and selects a small fraction of the seeds as candidates. Even this small fraction is necessarily very large, in order to maintain high sensitivity. High sensitivity (ideally very close to 100%) is essential, because any cancers missed at this stage can never be found by the CAD system. Hence, in the training process, many false positives are generated (significantly less than 1% of the candidates are positive), making the classification extremely unbalanced.

2. Extract features for each candidate: Unlike the previous step, the image processing algorithms to extract the features may be computationally expensive. Thus, sparse feature selection (while building the classifier) helps to ensure a relatively small number of features survive in the deployed CAD system.

3. Classify candidates as positive or negative: A previously-trained classifier is used to label each candidate.

4. Display positive candidates: Typically, the digitized image is displayed with marks for inspection by the physician.

CAD problems are known to be challenging for three reasons. First, typical CAD data sets for classification are large (several thousand candidates) and unbalanced, as states above. To be accepted by physicians, CAD systems must generalize well with extremely high sensitivity and with very few false positives. Second, when searching for features that can lead to superior generalization, researchers typically generate a large number of experimental features for each candidate, some of which can be redundant and irrelevant. Third, CAD systems are generally required to be fast enough for physicians to use in the middle of their diagnostic analysis.

SUMMARY OF THE INVENTION

Exemplary embodiments of the invention as described herein generally include methods and systems for a cascaded classification approach that solves a sequence of linear programs, each constructing a hyperplane classifier of the form $\text{sign}(w^T x+b)$ where x is the feature vector and (w, b) are model parameters to be determined. The linear programs are derived through piece-wise linear cost functions and the $l_1$-norm regularization condition. The resulting linear program works in the same principle as for the 1-norm SVM. The $l_1$-norm regularization inherently performs feature selection since penalizing on the l-norm regularization of w drives the resulting optimal w to be sparse, meaning only a few features receive a non-zero weight w. To incorporate the feature computational complexity into the selection of features, a weighted $l_1$-norm is employed where weights are determined by the computational cost of each feature. Each linear program employs an asymmetric error measure that penalizes false negatives and false positives with different weights. An extreme case is that the penalty for a false negative is infinity, which is used in the early stage of the cascade design to alleviate the skewed class distribution and preserve high detection rates.

A cascading strategy according to an embodiment of the invention incorporates the computational complexity of features into the cascade design. Such a cascaded classification strategy features easy classification, as detection becomes much more balanced at later stages, facilitating many advanced classification algorithms to be applied, and performing well at these stages when overall accuracy becomes more and more demanding. A cascaded classification strategy according to an embodiment of the invention is computationally efficient, for early stages weed out many non-nodule patterns, thus most stages are not evaluated for a typical non-nodule candidate. In addition, computationally expensive features are only calculated for a small portion of the candidates at later stages. Furthermore, the linear program with a $l_1$-norm regularization at each stage is a robust system. Although no theoretical justification is derived, a cascade of a few stages is unlikely to harm the robustness of linear classifiers, as opposed to a cascade of over 20 stages as is often obtained via AdaBoost cascades. The cascade at each stage depends on a set of features which is designed, as a group, to characterize a certain property of the structure of interest, such as, shape, size, isotropy.

A lung nodule detection system according to an embodiment of the invention that is used to illustrate such a CAD system generalizes well on an unseen test set and can outperform existing nodule detection algorithms.

According to an aspect of the invention, there is provided a method for computer aided detection of anatomical abnormalities in medical images, including providing a plurality of abnormality candidates and features of said abnormality candidates, and classifying said abnormality candidates as true positives or false positives using a hierarchical cascade of linear classifiers of the form $\text{sign}(w^T x+b)$, wherein x is a feature vector, w is a weighting vector and b is a model parameter, wherein different weights are used to penalize false negatives and false positives, and wherein more complex features are used for each successive stage of said cascade of classifiers.

According to a further aspect of the invention, each stage of said cascade solves a linear program formulated using a training error rate 4 equivalent to max $\{0, 1-y(w^T x + b)\}$ and an $l_1$-norm equivalent to $\|w\|_1 = \Sigma |w_i|$ summed over all features.

According to a further aspect of the invention, the $l_1$-norm is weighted by factors $\gamma_i$ related to the computational cost of the $i^{th}$ feature.

According to a further aspect of the invention, a false negative penalty is set to infinity for the early stages of said cascade of classifiers.

According to a further aspect of the invention, the abnormality candidates and features include a location, intensity statistics, and geometric information of each candidate.

According to a further aspect of the invention, each classifier of said cascade of classifiers uses a single set of features.

According to a further aspect of the invention, each classifier of said cascade of classifiers uses an accumulative set of features that includes those features used by preceding classifiers in said cascade.

According to a further aspect of the invention, the method comprises providing a digitized medical image comprising a plurality of intensities corresponding to a domain of points on a 3-dimensional grid, segmenting a region-of-interest from said medical image, generating said abnormality candidates and internal features of said abnormality candidates from said region-of-interest, and for each abnormality candidate, computing additional more complex features that characterize the shape, size, intensity statistics, and template matches for each candidate.

According to a further aspect of the invention, the linear program is equivalent to the system represented by $$\min_{u,v,\xi} \lambda \sum_{j=1}^{d} (u_j + v_j) + \frac{\mu}{l^+} \sum_{i \in C^+} \xi_i + \frac{1-\mu}{l^-} \sum_{i \in C^-} \xi_i, \quad (1)$$

$$y\left(\sum_j X_{ij}(u_j - v_j) + b\right) + \xi_i \geq 1,$$

such that $\xi_i \geq 0, i = 1, \ldots, l,$ $u_j, v_j \geq 0, j = 1, \ldots, d,$ where $\lambda > 0$ is a regularization parameter, $[x_i, y_i]$, $i = 1, \ldots, l$ denotes the abnormality candidates, y denotes a label indicating whether or not a candidate associated with a feature vector is a true positive, X denotes a feature matrix of d features wherein each row represents candidate feature vector x, and each column specifies a feature, $l^+$ is the number of positive candidates and $l^-$ the number of negative candidates, $C^+$ and $C^-$ contain, respectively, the sets of indices of positive candidates and negative candidates, $0 \leq \mu \leq 1$ is a tuning parameter for combining the false negative rate and false positive rate, and $w_j = u_j - v_j$.

According to a further aspect of the invention, imposing an infinite penalty comprises imposing a constraint equivalent to $$\sum_j X(u_j - v_j) + b \geq 0, \forall i \in C^+,$$

wherein said linear program is equivalent to the system represented by $$\min_{u,v,\xi} \lambda \sum_{j=1}^{d} (u_j + v_j) + \frac{1}{l^-} \sum_{i \in C^-} \xi_i,$$

$$\sum_j X(u_j - v_j) + b \geq 0, \forall i \in C^+,$$

$$-\sum_j X(u_j - v_j) - b + \xi_i \geq 0, \forall i \in C^-$$

such that $\xi_i \geq 0, i \in C^-,$ $u_j, v_j \geq 0, j = 1, \ldots, d,$ where $\lambda > 0$ is a regularization parameter, $\{x_i, y_i\}$, $i = 1, \ldots, l$ denotes the abnormality candidates, y denotes a label indicating whether or not a candidate associated with a feature vector is a true positive, X denotes a feature matrix of d features wherein each row represents candidate feature vector x, and each column specifies a feature, $l^+$ is the number of positive candidates and $l^-$ the number of negative candidates, $C^+$ and $C^-$ contain, respectively, the sets of indices of positive candidates and negative candidates, $0 \leq \mu \leq 1$ is a tuning parameter for combining the false negative rate and false positive rate, and $w_j = u_j - v_j$.

According to a further aspect of the invention, each said linear classifier is constructed using a boosting algorithm that includes partitioning said weights $w_i$ into a working set W for constructing said classifier and a remaining set N of weights eliminated from said classifier, initializing a first column vector of a feature matrix $X_{ij}$ to a vector of ones, solving said linear program using said first column, finding a next column vector that maximizes a quantity $\tau$ defined as $$\tau = \max_{j \in N} \left| \sum_{i'} \beta_{i'} y_i X_{ij} \right|,$$

wherein y is a label indicating whether or not a candidate associated with a feature vector is a true positive, and $\beta$ is derived from a Lagrangian dual to said linear program, and reinitializing said first column vector by including said next column vector, wherein if $\tau$ is less than a predetermined value, the boosting algorithm terminates.

According to another aspect of the invention, there is provided a program storage device readable by a computer, tangibly embodying a program of instructions executable by the computer to perform the method steps for computer aided detection of anatomical abnormalities in medical images.

DETAILED DESCRIPTION OF THE PREFERRED EMBODIMENTS

Figure 1:
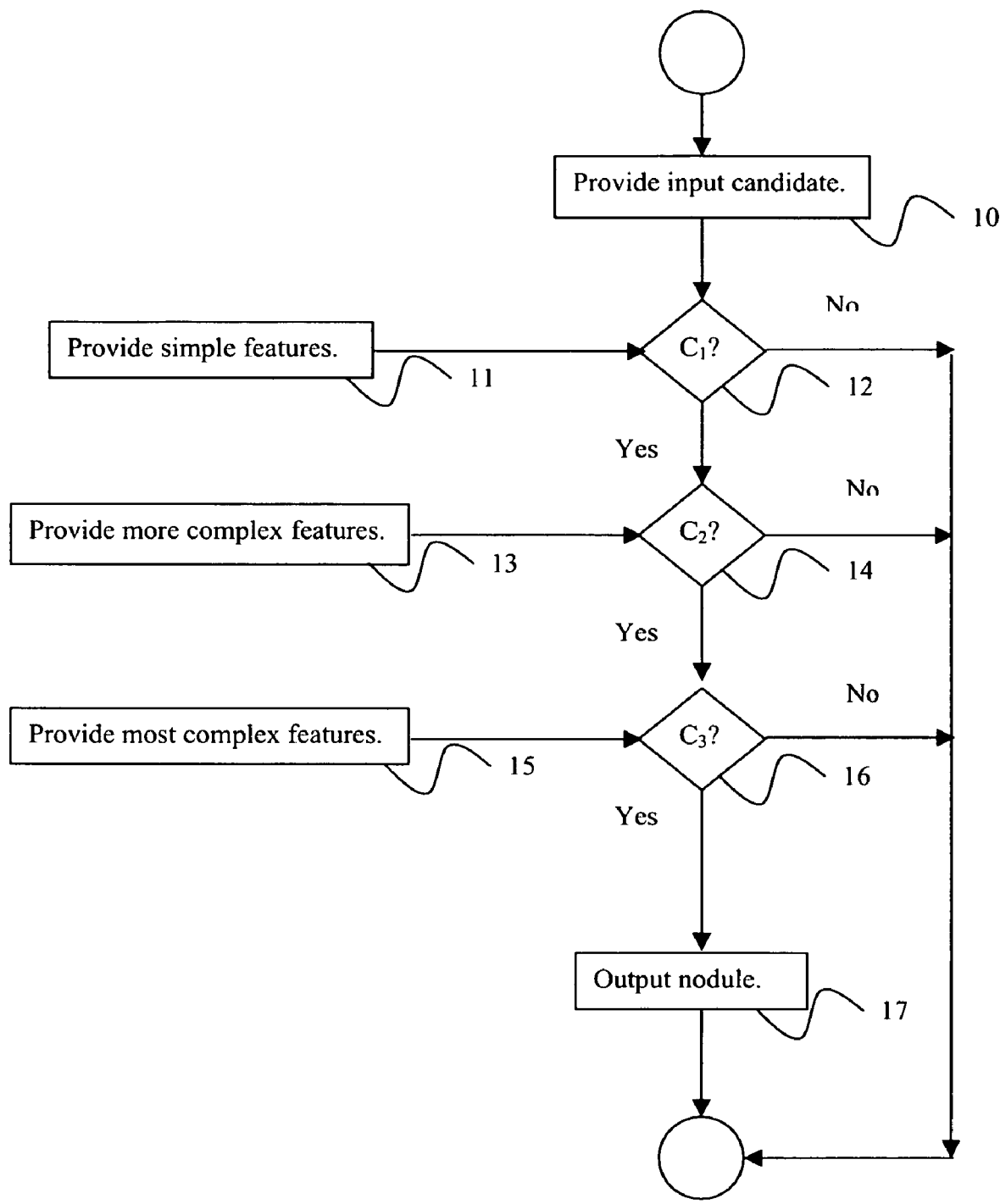
FIG. 1. depicts a cascade of classifiers for nodule detection, according to an embodiment of the invention.

Exemplary embodiments of the invention as described herein generally include systems and methods for computer-aided detection using a cascade classification approach which employs an asymmetric cascade of sparse classifiers each trained to achieve high detection sensitivity and satisfactory false positive rates. Further embodiments incorporate feature computational costs in a linear program formulation that allows the feature selection process to take into account different evaluation costs of various features. Further embodiments include a boosting algorithm derived from column generation optimization to effectively solve the proposed cascade linear programs. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

An exemplary CAD application is lung nodule detection. Lung cancer is the leading cause of cancer related death in western countries with a mean 5 year survival rate for all stages of only 14%. The prognosis of stage I cancer is more optimistic with a mean 5 year survival rate of about 49%. Although multi-slice CT scanners allow acquisition of the entire chest, only 15% of lung cancers are diagnosed at the early stage, as a single CT examination may acquire up to 700 axial images whose interpretation is tedious and perceptually demanding. CAD is considered to be a helpful diagnostic tool to handle this increasing amount of radiological data. It is well recognized that use of CAD not only offers the potential to decrease detection and recognition errors as a second reader, but also to reduce mistakes related to misinterpretation. Lung nodule detection is disclosed herein as a non-limiting example of the functionality of a system according to an embodiment of the invention.

An exemplary general purpose cascade classification method according to an embodiment of the invention that is based on sparse SVMs will be described herein below using lung-nodule detection in CT images as a representative example. However, the cascaded classification strategy of an embodiment of the invention is a general framework applicable to other detection tasks in medical images acquired from other imaging modalities, such as colon polyp detection, although the design of a cascaded classifier is problem-specific. Prior knowledge or domain insights may help identify good features to be included in various stages for a specific problem. Users can give high priority to more meaningful and interpretable features to use in early stages. If no such priori information exists, one philosophy is to have a preference for less complex and computationally cheap features. For example, the first stage may only consider those features that are computationally cheapest. Furthermore, the number of classifiers in the cascade of classifiers should be chosen for the specific task being addressed. Although 3 stages were used for the nodule detection embodiment disclosed herein, for other applications 2 or 4 stages would be appropriate.

According to an embodiment of the invention for lung nodule detection, for the generation of candidates and features, CT volumes of typical size 512% 512% 350 are used, representing a slice thickness of about 1 mm. In a preprocessing step, the region-of-interest, which for this embodiment of the invention is the lungs, is extracted using segmentation techniques, so that all generated candidates will be guaranteed to be inside the lungs. This also facilitates the detection of wall-attached nodules.

According to an embodiment of the invention, a linear programming framework can be used for constructing a cascade of sparse linear classifiers $w^T x + b$, where sparseness means only a few components of weight vector w are non-zero, with the result that only a few features in x need to be calculated. Each stage of the cascade solves a linear program which is formulated through the hinge loss $$\xi = \max\{0, 1 - y(w'x+b)\}$$

and the $l_1$-norm penalty or weighted $l_1$-norm penalty $$\|w\|_1^\gamma = \Sigma \gamma_i |w_i|$$

where $\gamma_i$ is a weighting factor related to the computational cost of the i-th feature assuming the cost information is available or otherwise it becomes the regular $l_1$-norm by setting all $\gamma=1$. Although the linear programs at each stage can be solved using any general-purpose linear program solver, according to an embodiment of the invention, a column generation technique for linear programs is equally suitable for optimizing each linear program in an incremental fashion such as performed by AdaBoost. Moreover, the column generation boosting derivation can be applied to any linear program regardless of the choice of the trade-off factor between the detection rate and the false positive rate.

In a pre-processing step, a candidate generation algorithm of an embodiment of the invention uses a robust blob detection strategy that identifies all blob structures. Blob-like structures vary in size, with a diameter starting about 3mm, the minimum size of interest to radiologists. The output of this step is the locations of candidates, along with some internal features that are generated as intermediate results of the candidate generator. These features include simple grey scale statistics and shape information of the blobs. According to an embodiment of the invention, a total 10 such features are output by the candidate generator. The candidate generators identify most of the nodules from the CT scans, but also generate many false positive candidates.

For each of the candidates, many more sophisticated features are computed to describe shape (both 2D and 3D), size intensity statistics (that describe texture), and template matching. The complexity of these features is approximately linear with respect to the size of the sub-volume in which the feature computation takes place. A set of more advanced and computationally demanding features are calculated as follows, according to an embodiment of the invention. According to an embodiment of the invention, for each detected candidate region, twenty seven features are computed. An exemplary feature computation uses an ellipsoid that is robustly fitted to the target and forms an approximate target segmentation. After the ellipsoidal fitting, the local volume around the candidate is affine-warped so that the fitted ellipsoid is aligned to a fixed-size sphere. The voxels lying within the sphere are used to compute various local intensity statistics and geometric features such as size and anisotropy. Furthermore, the intensity homogeneity is represented in a set of entropic measures. The Shannon entropy is computed for both intensity and gradient magnitude histograms. Intensity regularities in coarser levels are also captured by computing Jensen-Shannon divergences using local intensity and gradient histograms computed from a set of 3D linear-polar partitions of the sphere, such as concentric spheres of various radii and cones by regularly tessellating spherical coordinates. The Jensen-Shannon divergence extends the well known Kullback-Liebler divergence between a pair of probability distributions in order to describe overall similarity of a set of distributions. Intensity homogeneity can be represented with the Jensen-Shannon divergence by computing overall similarity of a set of intensity-based histograms derived from different sub-partitions. This approach allows a flexible extension of the entropy-based intensity homogeneity index as a function of arbitrary data partition and/or sampling.

A cascade hierarchy for lung nodule detection according to an embodiment of the invention has 3 stages, depicted in FIG. 1. The input candidate from the candidate generation (CG) algorithm is provided at step 10. The first stage, $C_1$, at step 12, considers the byproduct simple features of the candidate generation (CG) algorithm as discussed above, provided at step 11, because these features come together with candidates and require no extra computational cost. As observed in experiments, a significant number of non-nodule candidates are eliminated at this stage. This stage in the classification cascade can also be regarded as an effort to optimize the classification generator and can be a part of the classification generator. More advanced features are calculated at step 13 are calculated to improve the overall accuracy for both false negative and false positive rates. With these features, the second classifier, $C_2$, is run on those candidates not eliminated by classifier $C_1$ at step 14. This step in the cascade often achieves an acceptable performance. However, to further improve from acceptable performance to excellent performance, more advanced features are required, such as multi-scale statistics, which are often computationally demanding. These more advanced features are provided at step 15. A cascade of an embodiment of the invention includes these features with those candidates not eliminated by $C_2$ in the last stage, $C_3$, at step 16, so only candidates that survive after the second stage need these features. The surviving candidates are output as a nodule at step 17.

Each stage of the cascade can take a single set of features or treat computationally expensive features as an addition to the feature set which is already being used. A system according to an embodiment of the invention uses the accumulative set of features. The classifier cascade of FIG. 1 is exemplary and non-limiting, and a classifier cascade for other detections tasks can have more or fewer classifiers.

In a cascade, computation time and detection rate of the early stages determine the overall performance of the final system. As emphasized already in previous sections, any nodules missed at the first stage cannot be recovered later by the system. Detection sensitivity needs to be high, often 100%. In most cascade classification methods, a reasonable classifier is trained at this stage and then the decision threshold is adjusted (manually or in a greedy fashion) to minimize the false negatives. According to an embodiment of the invention, a more principled formulation is used that guarantees a 100% detection rate as well as optimizes the best possible false positive rate at 100% detection rate.

Denoting by $\{x_i, y_i\}$, $i=1, \ldots, l$ a candidate set generated by the CG algorithm, where X denotes the feature matrix where each row represents a candidate feature vector x, and each column specifies a feature, and use i to index the rows (or candidates) and j to index the various features. The symbol y represents a label that indicates whether or not a candidate associated with a feature vector is a nodule. For example, y=1, means the candidate is actually pointing to a nodule, while y=0, means it is a false positive. Notice that the feature vector x realizes different image features at different stages. Without loss of generality, it can be assumed that the 1-norm SVM receives $l^+$ positive candidates and $l^-$ non-nodule candidates, X contains d features, and $C^+$ and $C^-$ contain, respectively, the sets of indices of positive samples and negative samples.

A linear program formulation of an embodiment of the invention at each stage seeks an optimal hyperplane classifier by minimizing a weighted sum of the empirical error measure and the regularization factor. The classification error measure approximated via the hinge loss is generally defined by $\Sigma \xi_i / l$. To deal with the unbalanced problem, the error measure is defined as a convex combination of the false negative rate and false positive rate, i.e., $$\frac{\mu}{l^+} \sum_{i \in C^+} \xi_i + \frac{1-\mu}{l^-} \sum_{i \in C^-} \xi_i \qquad (1)$$

where $0 \leq \mu \leq 1$ is a tuning parameter. The asymmetric cascade classifier can be achieved by choosing an appropriate value of $\mu$ close enough to 1. However, this does not guarantee a 100% detection rate at the first stage which is desired for this design. An extreme case of the asymmetric error measure is to impose a penalty of infinity to a false negative so that the resulting classifier preserves all nodule candidates detected. This asymmetric error cannot be formulated as a convex combination of false positive and false negative rates, and it corresponds to imposing the constraint $$\sum_j X_{ij} w_j + b \geq 0, \forall i \in C^+.$$

To form a linear program, one rewrites $w_j = u_j - v_j$ and requires $u_j, v_j \geq 0$. The linear program is written as the following optimization problem with a regular $l_1$-norm regularization:

$$\min_{u,v,\xi} \lambda \sum_{j=1}^{d}(u_j + v_j) + \frac{1}{l^-}\sum_{i \in C^-} \xi_i, \quad (2)$$

$$\sum_j X(u_j - v_j) + b \geq 0, \forall i \in C^+,$$

$$-\sum_j X(u_j - v_j) - b + \xi_i \geq 0, \forall i \in C^-$$

such that $$\xi_i \geq 0, i \in C^-,$$

$$u_j, v_j \geq 0, j = 1, \ldots, d.$$

where $\lambda > 0$ is a regularization parameter. Note that $|w_j| = u_j + v_j$ if either $u_j$ or $v_j$ has to be 0. Solving the above LP yields solutions equivalent to those by the 1-norm SVM because at optimality, at least one of the two variables $u_j$ and $v_j$ will be zero for all $j=1, \ldots, d$.

The dual system for the above LP is now derived since the dual will play a role in the LPBoost algorithm according to an embodiment of the invention. The two variables $u_j, v_j$ correspond to a feature $X_j$ in LP (1). Correspondingly, the Lagrangian dual system has two constraints for the feature $$X_j: \sum_{i=1}^{l} \beta_i y_i X_{ij} \leq \lambda$$

and $$-\sum_{i=1}^{l} \beta_i y_i X_{ij} \leq \lambda.$$

Combining both constraints, one obtains:

$$-\lambda \leq \sum_{i=1}^{l} \beta_i y_i X_{ij} \leq \lambda.$$

Hence the dual system becomes:

$$\max_\beta \sum_{i \in C}^{l} \beta_i, \quad (3)$$

$$-\lambda \leq \sum_{i=1}^{l} \beta_i y_i X_{ij} \leq \lambda, j=, \ldots, d,$$

such that $$\sum_{i=1}^{l} \beta_i y_i = 0,$$

$$0 \leq \beta_i \leq \frac{1}{l^-}, i \in C^-.$$

The two linear programs (2) and (3) guarantee that all true positives remain to the next cascade stage. With all nodule candidates preserved, minimizing the error $$\frac{1}{l^-}\sum_{i \in C^-}\xi_i$$

reduces the largest possible number of false positives.

In later stages of a cascade, 100% detection rate may not be realistic to maintain in order to attain a reasonably good false positive rate. The convex combination error measure (1) is thus used in the linear programs to allow the presence of false negatives. In later stages, more and more computationally demanding features are included in the training of classifiers. According to an embodiment of the invention, cheaper features are allowed to do their best before resorting to expensive features, thus leading to a computational efficiency. The weighted $l_1$-norm regularization is employed to form linear programs where weighting factors are each determined by the computational cost of the corresponding feature. Consequently, expensive features will be selected with greater penalty in the objective function of linear programs. The optimization system can be formulated as the following linear program similarly by rewriting each $w_j = u_j - v_j$:

$$\min_{u,v,\xi} \lambda \sum_{j=1}^{d}(u_j + v_j) + \frac{\mu}{l^+}\sum_{i \in C^+}\xi_i + \frac{1-\mu}{l^-}\sum_{i \in C^-}\xi_i, \quad (4)$$

$$y\left(\sum_j X_{ij}(u_j - v_j) + b\right) + \xi_i \geq 1,$$

such that $$\xi_i \geq 0, i = 1, \ldots, l,$$

$$u_j, v_j \geq 0, j = 1, \ldots, d,$$

Analogous to the duality analysis of LP (2), the dual to LP (4) is formulated as follows:

$$\max_\beta \sum_{i=1}^{l} \beta_i, \quad (5)$$

$$-\lambda \leq \sum_{i=1}^{l} \beta_i y_i X_{ij} \leq \lambda, j=, \ldots, d,$$

$$\sum_{i=1}^{l} \beta_i y_i = 0,$$

such that $$0 \leq \beta_i \leq \frac{\mu}{l^+}, i \in C^+,$$

$$0 \leq \beta_i \leq \frac{1-\mu}{l^-}, i \in C^-.$$

Determining an appropriate weight vector based on the feature computational complexity can be problem specific. In an embodiment of the invention, the computation time was normalized in milliseconds by the Sigmoid function, so $\gamma$ ranges from 0.5 to 1.

According to an embodiment of the invention, LPBoost, a column generation boosting algorithm for linear programs, can be used for constructing cascaded classifiers at each stage with a 1-norm SVM which can be formulated as a linear program. LPBoost is a technique for optimizing linear programs (LP), and it can be applied to any linear program regardless of the penalty factor between the detection rate and the false positive rate. Note, however, that the proposed systems (2) and (4) are not limited to being solved only by LPBoost, and any linear program solver can be used to optimize the hence constructed linear programs (2) and (4), according to an embodiment of the invention. Although systems (2) and (4) can be optimized by any linear program solvers, the boosting scheme of an embodiment of the invention offers an on-line and incremental fashion solution, and provides as well insights into which features play roles during the training phase, facilitating feature selection.

In the context of LPBoost, a feature $X_j$ is viewed as a column. During a column generation process, features are continuously selected and classifiers are optimized based on the selected features corresponding to the columns generated. Column generation techniques have been widely used for solving large-scale LP systems since the 1950s. In the primal space, the column generation method solves LPs on a subset of variables w, which means not all columns of the matrix X are generated at once and used to construct the classifier. Columns are generated iteratively and added to the solution to achieve optimality. In the dual space, a column in the primal space corresponds to a constraint in the dual space. When a column is not included in the primal, the corresponding constraint does not appear in the dual. If a constraint absent from the dual system is violated by the solution to the restricted system, this constraint (a cutting plane) needs to be included in the dual system to further restrict the dual feasible region. A column generation boosting algorithm can be derived to solve LPs (2) and (4) by extending the existing LPBoost algorithm.

The LPBoost method partitions the variables $w_j$ into two sets, the working set W used to build the model and the remaining set, denoted N, that is eliminated from the model as the corresponding columns are not generated. Each generation step optimizes a sub-system over the working set W of variables and then selects a column from N to add to W. At each iteration, $w_j$ (i.e., $u_j$, $v_j$) in N can be interpreted as $w_j=0$, or accordingly, $u_j$, $v_j=0$. Hence once a solution $a^W=u^W-v^W$ to the restricted system is obtained, $\hat{\alpha}=(\alpha^W \alpha^N=0)$ is a feasible solution to the master LP, EQ. (2).

More generally, for a primal-dual solution $(\hat{u},\hat{v},\hat{\xi},\hat{\beta})$ to the restricted system of EQ. (2) with variable b always included in W, the solution is optimal to EQ. (2) if and only if for all $j \in N$, $|\Sigma_i \hat{\beta}_i y_i X_{ij}| \leq \lambda$. Optimality can be shown by confirming primal feasibility, dual feasibility and the equality of primal and dual objectives. Recall that $\hat{u}=(u^W u^N=0)$ and $\hat{v}=(v^W v^N=0)$, so $(\hat{u},\hat{v},\hat{\xi})$ is feasible for EQ. (2). Since the solution is optimal for the restricted system, the primal objective is equal to the dual objective. To evaluate feasibility, note that since $\hat{\beta}$ is optimal for the restricted system, it satisfies all constraints of the restricted dual. Hence the dual feasibility is validated if $|\Sigma_i \beta_i y_i X_{ij}| \leq \lambda$, $j \in N$. Similarly, it can be shown that the same optimality condition holds for the system of EQ. (4).

Any column that violates dual feasibility can be added. For LPs, a common heuristic is to choose the column $X_j$ that maximizes $|\Sigma_i \beta_i y_i X_{ij}|$ over all $j \in N$. In other words, the column $X_j$ that solves $$\tau = \max_{j \in N} \left| \sum_{i'} \beta_i y_i X_{ij} \right| \quad (6)$$

will be included in the restricted system. Compared with original LPBoost, a method according to an embodiment of the invention is in general equivalent to enclosing negations of weak models $X_{-j}$ in the hypothesis set.

A modified LPBoost for candidate generation for the LP of EQ. (4), according to an embodiment of the invention, where e is a vector of ones of appropriate dimension corresponding to the bias term b, is as follows.

1. Initialize the first column $X_0=e$, specify the tolerance tol.
2. For t=1 to T, do:
3. Solve EQ. (4) with $X_{t-1}$, obtain solution $(u^t, v^t, \xi^t, \beta^t)$.
4. Solve EQ. (6) to obtain $\tau$, and let z be the solution.
5. If $\tau \leq \lambda$+tol, then
   the solution is optimal, break from loop,
   otherwise
   $X_t=[X_{t-1} z]$, continue.
6. End of loop.
7. $\hat{w}=u^t-v^t$.

Similarly, a column generation algorithm for EQ (2) can be derived by substituting EQ. (2) for EQ. (4) in step 3.

A cascaded classification algorithm according to an embodiment of the invention was validated with respect to its generalization performance and computational efficiency in the execution phase. To evaluate the effectiveness of the cascading strategy, a single 1-norm SVM model without any cascade was constructed to compare with the cascaded 1-norm SVM classifier. A classification algorithm according to an embodiment of the invention was also compared with the greedy search algorithm in a previous lung nodule detection system.

A system according to an embodiment of the invention was tested using a database of 176 high-resolution CT images randomly divided into two sets: a training set of 90 volumes and a test set of 86 volumes. Radiologists identified and labeled 129 nodules, of which 81 appeared in the training set and 48 in the test set. The training set was used to optimize the classification parameters, that the final classifier was tested on the independent test set.

The CG procedure was independently applied to the training and test sets, achieving a 98.8% detection rate on the training set with 121 FPs per volume, and a 93.6% detection rate on the test set with 161 FPs per volume. There can exist multiple candidates pointing to one nodule, so 131 and 81 candidates were labeled as positive in the training set and test set, respectively. A total of 86 numerical image features were designed, 10 of which came from the CG step with no extra computational burden and were used to train the first classifier. Feature set 2 contained size, shape, and intensity features which was used with the CG features to learn the second classifier. The multi-scale statistical features depicting higher-order properties of nodules comprised feature set 3 and were used in the final classifier construction together with all other features.

Figures 2, 3:
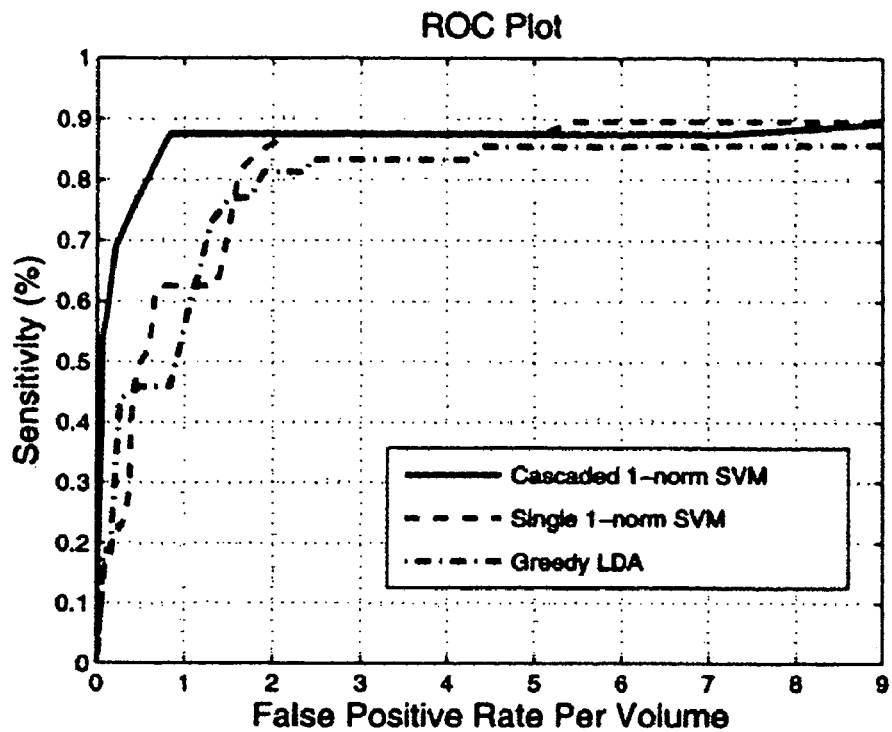
FIG. 2 depicts ROC curves of 3 classifiers on test data, according to an embodiment of the invention.
FIG. 3 is a table presenting the number of selected features and number of remaining candidates after corresponding stages, according to an embodiment of the invention.

The tuning parameters in a greedy LDA approach and the parameters $(\lambda, \mu)$ in an approach according to an embodiment of the invention were optimized according to a leave-one-patient-out (LOPO) cross validation procedure. Parameters at each stage of the cascade were tuned to achieve the best LOPO performance. The single 1-norm SVM was tuned to attain the best overall LOPO performance. FIG. 2 is a graph of the Receiver Operator Characteristic (ROC) curves of the classifiers, respectively, obtained by the three algorithms, showing the domination of the ROC curve of the cascaded classifier over the other two classifiers. In particular, the cascaded classifier according to an embodiment of the invention decreases false positives while preserving detection accuracy.

FIG. 3 is a table presenting the number of features selected from the different feature sets along with the numbers of candidates remaining after corresponding stages or classifiers. By "SVM" and "LDA" is meant the 1-norm SVM single model and the greedy LDA approach. It is apparent from the table that for the cascaded classifier, the 3 stages together selected 18 features of which only 2 were from feature set 3. After the last stage of the cascade, a system according to an embodiment of the invention achieved an 87.5% detection rate with a 0.7 FP rate. The first stage reduced the FP rate from 161 to 34.1. The 1-norm SVM single model and the greedy LDA both selected more features from set 3 and computed these features for all candidates, resulting in a significantly longer running time than a cascaded classifier.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
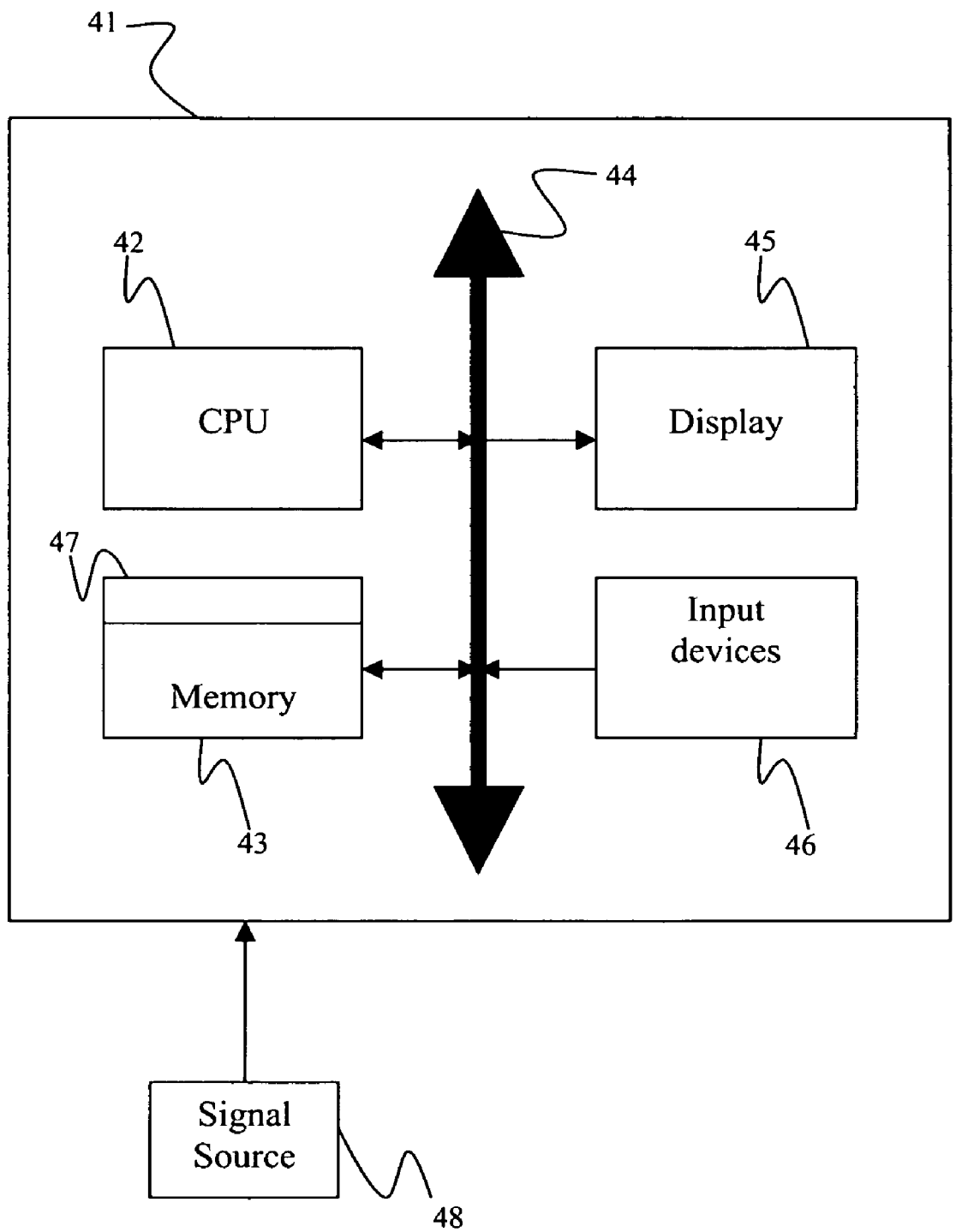
FIG. 4 is a block diagram of an exemplary computer system for implementing computer-aided detection employing a cascade of asymmetric linear classifiers, according to an embodiment of the invention.

FIG. 4 is a block diagram of an exemplary computer system for implementing computer-aided detection employing a cascade of asymmetric linear classifiers according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for computer aided detection of anatomical abnormalities in medical images comprising the steps of:
providing a plurality of abnormality candidates and features of said abnormality candidates; and
classifying said abnormality candidates as true positives or false positives using a hierarchical cascade of linear classifiers of the form sign($w^T x+b$), wherein x is a feature vector, w is a weighting vector and b is a model parameter, wherein different weights are used to penalize false negatives and false positives, and wherein more computationally complex features are used for each successive stage of said cascade of classifiers, wherein each stage of said cascade solves a linear program formulated using a training error rate $\xi$ equivalent to max $\{0, 1-y(w^T x+b)\}$ and an $l_1$-norm equivalent to $$\|w\|_1 = \sum |w_i|$$

summed over all features, wherein said linear program is equivalent to the system represented by $$\min_{u,v,\xi} \lambda \sum_{j=1}^{d} (u_j + v_j) + \frac{\mu}{l^+} \sum_{i \in C^+} \xi_i + \frac{1-\mu}{l^-} \sum_{i \in C^-} \xi_i, \quad (1)$$

$$y\left(\sum_j X_{ij}(u_j - v_j) + b\right) + \xi_i \geq 1,$$

such that $$\xi_i \geq 0, i = 1, \ldots, l,$$

$$u_j, v_j \geq 0, j = 1, \ldots, d,$$

wherein $\lambda > 0$ is a regularization parameter, $\{x_i, y_i\}$, $i=1,\ldots,l$ denotes the abnormality candidates, y denotes a label indicating whether or not a candidate associated with a feature vector is a true positive, X denotes a feature matrix of d features wherein each row represents candidate feature vector x, and each column specifies a feature, $l^+$ is the number of positive candidates and $l^-$ the number of negative candidates, $C^+$ and $C^-$ contain, respectively, the sets of indices of positive candidates and negative candidates, $0 \leq \mu \leq 1$ is a tuning parameter for combining the false negative rate and false positive rate, and $w_j = u_j - v_j$.

2. The method of claim 1, wherein said $l_1$-norm is weighted by factors $\gamma_i$ related to the computational cost of the $i^{th}$ feature.

3. The method of claim 1, wherein a false negative penalty is set to infinity for the early stages of said cascade of classifiers.

4. The method of claim 1, wherein said abnormality candidates and features include a location, intensity statistics, and geometric information of each candidate.

5. The method of claim 1, wherein each classifier of said cascade of classifiers uses a single set of features.

6. The method of claim 1, wherein each classifier of said cascade of classifiers uses an accumulative set of features that includes those features used by preceding classifiers in said cascade.

7. The method of claim 1, further comprising providing a digitized medical image comprising a plurality of intensities corresponding to a domain of points on a 3-dimensional grid; segmenting a region-of-interest from said medical image;

generating said abnormality candidates and internal features of said abnormality candidates from said region-of-interest; and for each abnormality candidate, computing additional more computationally complex features that characterize the shape, size, intensity statistics, and template matches for each candidate.

8. A method for computer aided detection of anatomical abnormalities in medical images comprising the steps of:

providing a plurality of abnormality candidates and features of said abnormality candidates; and classifying said abnormality candidates as true positives or false positives using a hierarchical cascade of linear classifiers of the form $\text{sign}(w^T x + b)$, wherein x is a feature vector, w is a weighting vector and b is a model parameter, wherein different weights are used to penalize false negatives and false positives, and wherein more computationally complex features are used for each successive stage of said cascade of classifiers, wherein a false negative penalty is set to infinity for the early stages of said cascade of classifiers, and wherein imposing an infinite penalty comprises imposing a constraint equivalent to $$\sum_j X(u_j - v_j) + b \geq 0, \forall i \in C^+,$$

wherein said linear program is equivalent to the system represented by $$\min_{u,v,\xi} \lambda \sum_{j=1}^d (u_j + v_j) + \frac{1}{l^-} \sum_{i \in C^-} \xi_i,$$

$$\sum_j X(u_j - v_j) + b \geq 0, \forall i \in C^+,$$

$$-\sum_j X(u_j - v_j) - b + \xi_i \geq 0, \forall i \in C^-$$

such that $\xi_i \geq 0, i \in C^-,$ $u_j, v_j \geq 0, j = 1, \ldots, d,$ wherein $\lambda > 0$ is a regularization parameter, $\{x_i, y_i\}$, $i=1, \ldots, l$ denotes the abnormality candidates, y denotes a label indicating whether or not a candidate associated with a feature vector is a true positive, X denotes a feature matrix of d features wherein each row represents candidate feature vector x, and each column specifies a feature, $l^+$ is the number of positive candidates and $l^-$ the number of negative candidates, $C^+$ and $C^-$ contain, respectively, the sets of indices of positive candidates and negative candidates, $0 \leq \mu \leq 1$ is a tuning parameter for combining the false negative rate and false positive rate, and $w_j = u_j - v_j$.

9. A method for computer aided detection of anatomical abnormalities in medical images comprising the steps of:

providing a plurality of abnormality candidates and features of said abnormality candidates; and classifying said abnormality candidates as true positives or false positives using a hierarchical cascade of linear classifiers of the form $\text{sign}(w^T x + b)$, wherein x is a feature vector, w is a weighting vector and b is a model parameter, wherein different weights are used to penalize false negatives and false positives, and wherein more computationally complex features are used for each successive stage of said cascade of classifiers, wherein each stage of said cascade solves a linear program formulated using a training error rate $\xi$ equivalent to max $\{0, 1 - y(w^T x + b)\}$ and an $l_1$-norm equivalent to $$\|w\|_1 = \sum |w_i|$$

summed over all features, wherein each said linear classifier is constructed using a boosting algorithm comprising the steps of:

partitioning said weights $w_i$ into a working set W for constructing said classifier and a remaining set N of weights eliminated from said classifier;

initializing a first column vector of a feature matrix $X_{ij}$ to a vector of ones;

solving said linear program using said first column;

finding a next column vector that maximizes a quantity $\tau$ defined as $$\tau = \max_{j \in N} \left| \sum_{i'} \beta_i y_i X_{ij} \right|,$$

wherein y is a label indicating whether or not a candidate associated with a feature vector is a true positive, and $\beta$ is derived from a Lagrangian dual to said linear program; and reinitializing said first column vector by including said next column vector, wherein if $\tau$ is less than a predetermined value, the boosting algorithm terminates.

10. A method for computer aided detection of anatomical abnormalities in medical images comprising the steps of:

providing a plurality of abnormality candidates and internal features of said abnormality candidates; and classifying said abnormality candidates as true positives or false positives using a plurality of linear programs arranged in a hierarchical cascade, said programs constructing classifiers of the form $\text{sign}(w^T x + b)$, wherein x is a feature vector, w is a weighting vector and b is a model parameter, wherein each stage of said cascade solves a linear program formulated using a training error rate equivalent to max $\{0, 1 - y(w^T x + b)\}$ and an $l_1$-norm equivalent to $$\|w\|_1 = \sum |w_i|$$

summed over all features, wherein each said linear classifier is constructed using a boosting algorithm comprising the steps of:

partitioning said weights $w_i$ into a working set W for constructing said classifier and a remaining set N of weights eliminated from said classifier;

initializing a first column vector of a feature matrix $X_{ij}$ to a vector of ones;

solving said linear program using said first column;

finding a next column vector that maximizes a quantity $\tau$ defined as $$\tau = \max_{j \in N} \left| \sum_{i'} \beta_i y_i X_{ij} \right|,$$

wherein y is a label indicating whether or not a candidate associated with a feature vector is a true positive, and β is derived from a Lagrangian dual to said linear program; and reinitializing said first column vector by including said next column vector, wherein if τ is less than a predetermined value, the boosting algorithm terminates.

11. The method of claim 10, wherein different weights are used to penalize false negatives and false positives, and wherein a first classifier uses said internal features and each successive classifier of said cascade uses more computationally complex features to eliminate false positives from said abnormality candidates.

12. A program storage device readable by a computer, tangibly embodying a program of instructions executable by the computer to perform the method steps for computer aided detection of anatomical abnormalities in medical images, said method comprising the steps of:

providing a plurality of abnormality candidates and features of said abnormality candidates; and classifying said abnormality candidates as true positives or false positives using a hierarchical cascade of linear classifiers of the form sign($w^T x+b$), wherein x is a feature vector, w is a weighting vector and b is a model parameter, wherein different weights are used to penalize false negatives and false positives, and wherein more computationally complex features are used for each successive stage of said cascade of classifiers, wherein each stage of said cascade solves a linear program formulated using a training error rate ξ equivalent to max {0,1−y($w^T x+b$)} and an $l_1$-norm equivalent to $\|w\|_1 = \Sigma|w_1|$ summed over all features, wherein said linear program is equivalent to the system represented by $$\min_{u,v,\xi} \lambda \sum_{j=1}^{d} (u_j + v_j) + \frac{\mu}{l^+} \sum_{i \in C^+} \xi_i + \frac{1-\mu}{l^-} \sum_{i \in C^-} \xi_i, \quad (1)$$

$$y \left( \sum_j X_{ij}(u_j - v_j) + b \right) + \xi_i \geq 1,$$

such that $$\xi_i \geq 0, i = 1, \ldots, l,$$

$$u_j, v_j \geq 0, j = 1, \ldots, d,$$

wherein $\lambda > 0$ is a regularization parameter, $\{x_i, y_i\}$, i=1, . . . , l denotes the abnormality candidates, y denotes a label indicating whether or not a candidate associated with a feature vector is a true positive, X denotes a feature matrix of d features wherein each row represents candidate feature vector x, and each column specifies a feature, $l^+$ is the number of positive candidates and $l^-$ the number of negative candidates, $C^+$ and $C^-$ contain, respectively, the sets of indices of positive candidates and negative candidates, $0 \leq \mu \leq 1$ is a tuning parameter for combining the false negative rate and false positive rate, and $w_j = u_j - v_j$.

13. The computer readable program storage device of claim 12, wherein said $l_1$-norm is weighted by factors $\gamma_i$ related to the computational cost of the $i^{th}$ feature.

14. The computer readable program storage device of claim 12, wherein a false negative penalty is set to infinity for the early stages of said cascade of classifiers.

15. The computer readable program storage device of claim 12, wherein said abnormality candidates and features include a location, intensity statistics, and geometric information of each candidate.

16. The computer readable program storage device of claim 12, wherein each classifier of said cascade of classifiers uses a single set of features.

17. The computer readable program storage device of claim 12, wherein each classifier of said cascade of classifiers uses an accumulative set of features that includes those features used by preceding classifiers in said cascade.

18. The computer readable program storage device of claim 12, the method further comprising providing a digitized medical image comprising a plurality of intensities corresponding to a domain of points on a 3-dimensional grid;

segmenting a region-of-interest from said medical image;

generating said abnormality candidates and internal features of said abnormality candidates from said region-of-interest; and for each abnormality candidate, computing additional more computationally complex features that characterize the shape, size, intensity statistics, and template matches for each candidate.

19. A program storage device readable by a computer, tangibly embodying a program of instructions executable by the computer to perform the method steps for computer aided detection of anatomical abnormalities in medical images, said method comprising the steps of:

providing a plurality of abnormality candidates and features of said abnormality candidates; and classifying said abnormality candidates as true positives or false positives using a hierarchical cascade of linear classifiers of the form sign($w^T x+b$), wherein x is a feature vector, w is a weighting vector and b is a model parameter, wherein different weights are used to penalize false negatives and false positives, and wherein more computationally complex features are used for each successive stage of said cascade of classifiers, wherein a false negative penalty is set to infinity for the early stages of said cascade of classifiers, and wherein imposing an infinite penalty comprises imposing a constraint equivalent to $$\sum_j X(u_j - v_j) + b \geq 0, \forall i \in C^+,$$

wherein said linear program is equivalent to the system represented by $$\min_{u,v,\xi} \lambda \sum_{j=1}^{d} (u_j + v_j) + \frac{1}{l^-} \sum_{i \in C^-} \xi_i,$$

$$\sum_j X(u_j - v_j) + b \geq 0, \forall i \in C^+,$$

$$-\sum_j X(u_j - v_j) - b + \xi_i \geq 0, \forall i \in C^-$$

such that $$\xi_i \geq 0, i \in C^-,$$

$$u_j, v_j \geq 0, j = 1, \ldots, d,$$

wherein $\lambda > 0$ is a regularization parameter, $\{x_i, y_i\}$, i=1, . . . , l denotes the abnormality candidates, y denotes a label indicating whether or not a candidate associated with a feature vector is a true positive, X denotes a feature matrix of d features wherein each row represents candidate feature vector x, and each column specifies a feature, $l^+$ is the number of positive candidates and $l^-$ the number of negative candidates, $C^+$ and $C^-$ contain, respectively, the sets of indices of positive candidates and negative candidates, $0 \leq \mu \leq 1$ is a tuning parameter for combining the false negative rate and false positive rate, and $w_j = u_j - v_j$.

20. A program storage device readable by a computer, tangibly embodying a program of instructions executable by the computer to perform the method steps for computer aided detection of anatomical abnormalities in medical images, said method comprising the steps of:

providing a plurality of abnormality candidates and features of said abnormality candidates; and classifying said abnormality candidates as true positives or false positives using a hierarchical cascade of linear classifiers of the form sign($w^T x + b$), wherein x is a feature vector, w is a weighting vector and b is a model parameter, wherein different weights are used to penalize false negatives and false positives, and wherein more computationally complex features are used for each successive stage of said cascade of classifiers., wherein each stage of said cascade solves a linear program formulated using a training error rate $\xi$ equivalent to max $\{0, 1-y(w^T x + b)\}$ and an $l_1$-norm equivalent to $$\|w\|_1 = \sum |w_i|$$

summed over all features, wherein each said linear classifier is constructed using a boosting algorithm comprising the steps of:

partitioning said weights $w_1$ into a working set W for constructing said classifier and a remaining set N of weights eliminated from said classifier;

initializing a first column vector of a feature matrix $X_{ij}$ to a vector of ones;

solving said linear program using said first column;

finding a next column vector that maximizes a quantity $\tau$ defined as $$\tau = \max_{j \in N} \left| \sum_{i'} \beta_{i'} y_i X_{ij} \right|,$$

wherein y is a label indicating whether or not a candidate associated with a feature vector is a true positive, and $\beta$ is derived from a Lagrangian dual to said linear program; and reinitializing said first column vector by including said next column vector, wherein if $\tau$ is less than a predetermined value, the boosting algorithm terminates.

* * * * *